(12) United States Patent
Toyoda et al.

(10) Patent No.: US 7,538,956 B2
(45) Date of Patent: May 26, 2009

(54) PANORAMIC IMAGING DEVICE

(75) Inventors: Takashi Toyoda, Daito (JP); Yoshizumi Nakao, Daito (JP); Yasuo Masaki, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 90 days.

(21) Appl. No.: 11/736,267

(22) Filed: Apr. 17, 2007

(65) Prior Publication Data

US 2007/0242946 A1 Oct. 18, 2007

(30) Foreign Application Priority Data

Apr. 18, 2006 (JP) .............................. 2006-114306

(51) Int. Cl.
G02B 17/00 (2006.01)
(52) U.S. Cl. ........................... 359/726; 359/725; 348/36
(58) Field of Classification Search ......... 359/725–736; 348/36–39

See application file for complete search history.

(56) References Cited

U.S. PATENT DOCUMENTS 3,356,002 A * 12/1967 Raitiere ...................... 396/322
4,900,914 A    2/1990 Raff et al.

FOREIGN PATENT DOCUMENTS

| | | |
|---|---|---|
| DE | 29 26 731 B1 | 1/1981 |
| EP | 0 292 111 A1 | 11/1988 |
| EP | 0 292 764 A2 | 11/1988 |
| JP | 5-18175 U | 3/1993 |
| JP | 10-145657 A | 5/1998 |
| JP | 11-125773 A | 5/1999 |
| JP | 11-352550 A | 12/1999 |
| JP | 2000-325307 A | 11/2000 |
| JP | 2005-26786 A | 1/2005 |
| JP | 2005-51419 A | 2/2005 |

OTHER PUBLICATIONS

European Search Report dated Aug. 14, 2007 (Nine (9) Pages).
Notice of the Reason for Refusal dated Apr. 22, 2008 with English translation (Six (6) Pages).

* cited by examiner

*Primary Examiner*—Darryl J Collins
(74) *Attorney, Agent, or Firm*—Crowell & Moring LLP

(57) ABSTRACT

A panoramic imaging device comprises: a lens array having a center lens for receiving light entering in a front range of at most 60° in a capture angle and left and right side lenses formed on the same plane as that with the center lens formed thereon and having optical axes parallel to that of the center lens for receiving lights entering in left and right ranges each of at most 60° in the capture angle; and prisms or mirrors placed on light entrance side of the lens array for guiding and reflecting lights entering in the left and right ranges, such that each light entering each side lens is directed along the optical axis of each side lens. Images formed by the center lens and the left and right side lenses are combined into a panoramic image with a picture angle of at least 120°.

9 Claims, 9 Drawing Sheets

PANORAMIC IMAGING DEVICE

CROSS REFERENCE TO RELATED APPLICATIONS

This application contains related subject matter to the Assignee's co-pending application Ser. No. 11/846,806, filed Aug. 29, 2007, and Ser. No. 11/837,836, filed Aug. 13, 2007.

BACKGROUND OF THE INVENTION

1. Field of the Invention

The present invention relates to a panoramic imaging device.

2. Description of the Related Art

It is known to use an imaging device having an ultra-wide-angle optical system such as a fisheye lens to capture or take a panoramic image with a picture angle greater than 120° (degrees). However, the panoramic image captured by such imaging device is likely to have barrel distortion at periphery thereof. On the other hand, technologies have advanced to convert captured images to digital information, and process it. There are various imaging devices which have been developed to create a panoramic image based on such technologies, in which images in multiple picture-taking areas are captured by multiple optical systems positioned at predetermined angular positions for the respective picture-taking areas, and are combined into a panoramic image.

For example, an imaging device is known which uses three optical systems having lenses in front and on the left and right sides thereof, respectively, to form three images which are then electronically combined to form or reproduce a panoramic image with a picture angle of 180° (degrees) (refer to e.g. Japanese Laid-open Patent Publication 2005-26786). In order to form a panoramic image with a picture angle greater than 180°, two of the three optical systems in this imaging device uses very wide-angle lenses with a capture angle (or picture-taking angle) of 94.4°.

Thus, in order to form a panoramic image with a picture angle greater than 120° or 180° by using a small number of optical systems (lenses), it is necessary for a lens in an optical system to have a wide capture angle greater than 60°. This is advantageous because the small number of optical systems allows the imaging device to have a simple structure, thereby reducing the cost. However, this leads to a disadvantage in that images formed by using lenses having a capture angle greater than 60° are likely to have barrel distortions at peripheries thereof as described above, and that the barrel distortions cause unnatural transition between adjacent images in the panoramic image.

Normally, it is possible to digitally correct the barrel distortions at the peripheries of images. However, in the case where the images are captured by using wide-angle lenses having a capture angle much greater than 60° the images have larger barrel distortions, so that it is difficult to completely eliminate unnatural transition between adjacent images, and that complex programs are required to correct the barrel distortions. These problems are required to be solved. Furthermore, a panoramic imaging device of this kind should preferably be reduced in volume and thickness as much as possible, because a panoramic imaging device, for example, for capturing an image with a picture angle greater than e.g. 180° is mounted, in use, on a car body to image an area behind the car body, which is located in a dead angle of a driver.

SUMMARY OF THE INVENTION

An object of the present invention is to provide a panoramic imaging device for capturing a panoramic image with a picture angle of at least 120°, which can be formed by a minimum number of optical systems without using an optical lens having a capture angle much greater than 60°, and which can combine multiple images into a panoramic image without complex image correction and without causing unnatural transition between adjacent images to remain, and further which can be reduced in volume and thickness in its entirety.

According to the present invention, this object is achieved by a panoramic imaging device comprising: an optical lens system for collecting light entering in a capture angle of at least 120° so as to form images on a predetermined focal plane; imaging means placed at the focal plane for converting the images formed by the optical lens system to electronic image information; and image reproducing means for subjecting the electronic image information obtained from the imaging means to imaging processing so as to reproduce a panoramic image. The optical lens system comprises: an optical lens array having a center lens for receiving light entering in a front range of not larger than 60° in the capture angle as well as left and right side lenses which are formed on the same plane as that with the center lens formed thereon and on left and right sides of the center lens, respectively, and which have optical axes parallel to that of the center lens, so as to respectively receive lights entering in left and right ranges each of not larger than 60° in the capture angle; and light reflecting means placed on a light entrance side of the optical lens array for guiding and reflecting the lights entering in the left and right ranges each of not larger than 60° in the capture angle to the left and right side lenses, respectively, such that each light entering each side lens is directed along the optical axis of the each side lens.

The imaging means is formed of a photodetector array placed at a predetermined distance from, and in parallel to, the optical lens array for capturing an image formed by the center lens and images formed by the left and right side lenses. The image reproducing means combines the image formed by the center lens in the front range of not larger than 60° in the capture angle with the images respectively formed by the left and right side lenses in the left and right ranges each of not larger than 60° in the capture angle so as to reproduce a panoramic image with a picture angle of at least 120°.

The panoramic imaging device according to the present invention makes it possible to form a panoramic image with a picture angle of at least 120° by a minimum number of optical systems without using a lens having a capture angle much greater than 60°, and to combine multiple images into the panoramic image without complex image correction and without causing unnatural transition between adjacent images to remain, and also to reduce the entire volume and thickness thereof.

Preferably, the light reflecting means placed on the light entrance side of the optical lens array is positioned at a position to prevent light entering the center lens in the front range in the capture angle from being interrupted thereby.

Further preferably, the light reflecting means comprises at least one prism.

The panoramic imaging device can be designed so that the center lens receives light entering in the front range of 40° in the capture angle, while the left and right side lenses respectively receive lights entering in the left and right ranges each of 40° in the capture angle.

The light reflecting means can comprise 45-45-90 degree right-angle prisms.

The light reflecting means can comprise 30-60-90 degree right-angle prisms.

It can also be designed so that the center lens receives light entering in the front range of 60° in the capture angle, while the left and right side lenses respectively receive lights entering in the left and right ranges each of 60° in the capture angle.

The light reflecting means can comprise at least one triangle prism.

The light reflecting means can comprise mirrors.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1:
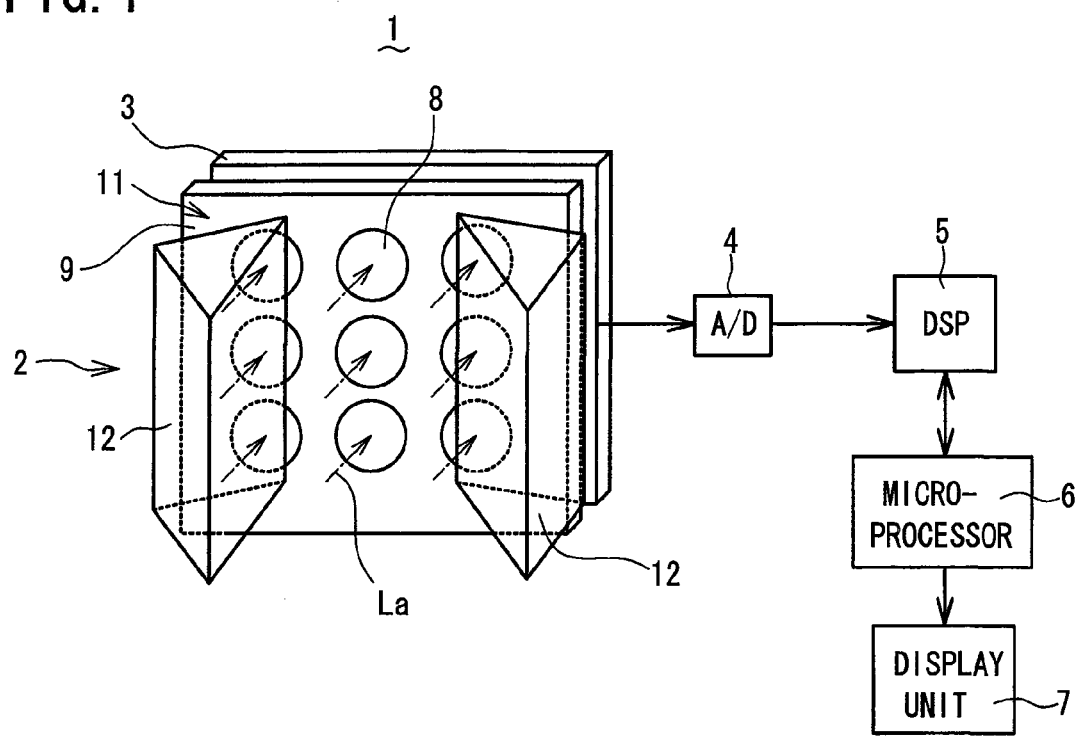
FIG. 1 is a schematic perspective view of a panoramic imaging device according to a first embodiment of the present invention.

Embodiments of the present invention, as best mode for carrying out the invention, will be described hereinafter with reference to the drawings. The present invention relates to a panoramic imaging device. It is to be understood that the embodiments described herein are not intended as limiting, or encompassing the entire scope of, the present invention. Note that like parts are designated by like reference numerals, characters or symbols throughout the drawings.

First Embodiment

Figure 2:
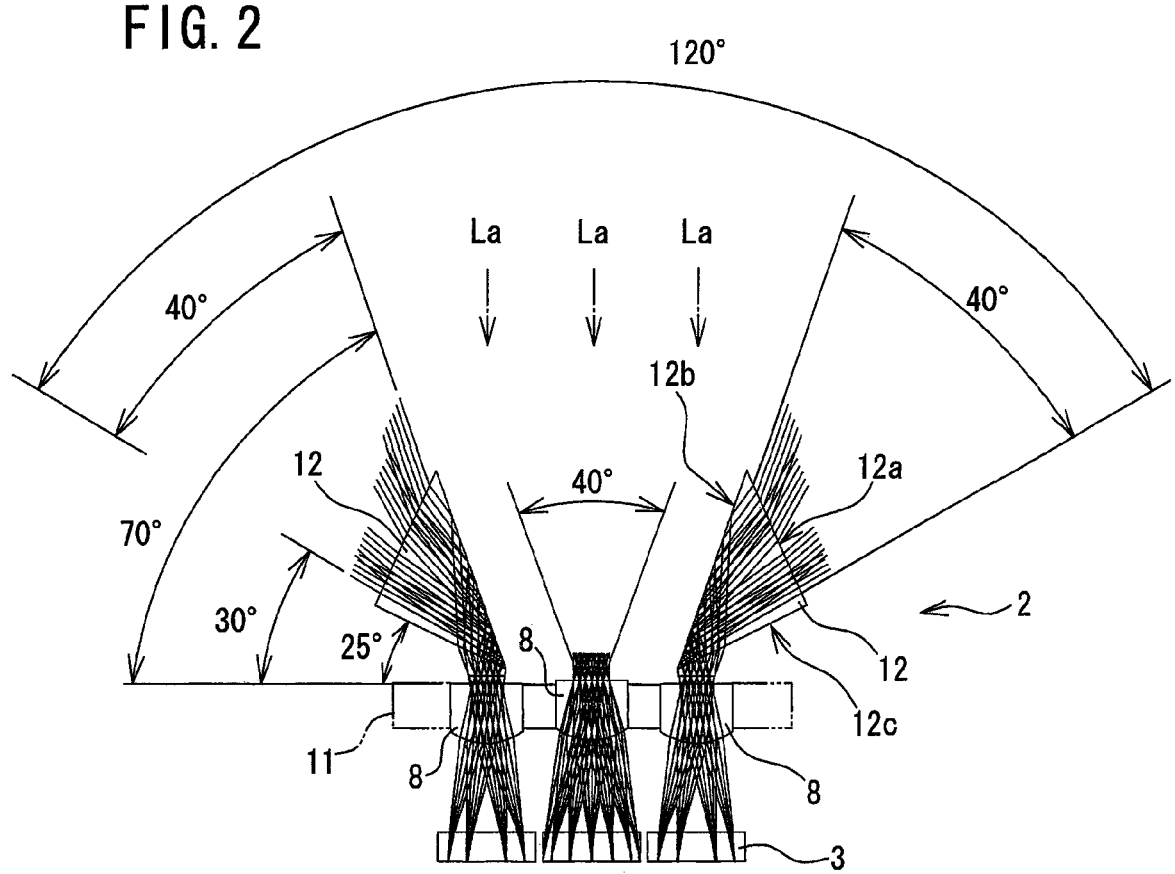
FIG. 2 is a schematic optical path diagram of an optical lens system of the panoramic imaging device with optical lenses, showing a light flux passing through each optical lens.

Referring to FIG. 1 to FIG. 5, a panoramic imaging device 1 according to a first embodiment of the present invention will be described. FIG. 1 is a schematic perspective view of the panoramic imaging device 1 including an optical lens system 2 having optical lenses 8 and a photodetector array 3 along with a processing circuit, in block diagram form, for signal processing and display, while FIG. 2 is a schematic optical path diagram of the optical lens system 2 of FIG. 1 as seen from the bottom thereof, showing a light flux passing through each optical lens 8.

As shown in FIG. 1 and FIG. 2, the panoramic imaging device 1 according to the present embodiment comprises: an optical lens system 2 for collecting light entering therein in a capture angle (picture-taking angle) of 120° (substantially 120°) so as to form images on a predetermined focal plane; a photodetector array (claimed "imaging means") 3 placed at the focal plane of the optical lens system 2 for converting the images formed by the optical lens system 2 to electronic image information; and a processing circuit for signal processing and display. The processing circuit comprises: an A/D (Analog-to-Digital) converter 4 for converting the electronic image information from the photodetector array 3 to a digital signal; a DSP (Digital Signal Processor) 5 controlled by an image reproduction microprocessor 6 (the combination of the DSP 5 and the image reproduction microprocessor 6 being claimed "image reproducing means") for subjecting the digital signal (the digital signal here can be broadly referred to as the electronic image information) from the A/D converter 4 to image processing to reproduce a panoramic image from the digital signal of the electronic image information; and a display unit 7 such as a liquid crystal panel for displaying the reproduced panoramic image.

The optical lens system 2 according to the present embodiment comprises: an optical lens array 11 having 9 (nine) optical lenses 8 which have mutually parallel optical axes La, and which are arranged in a matrix of 3 (three) rows and 3 (three) columns and integrally formed as single convex lenses on one plane or surface of a transparent substrate 9; and two 45-45-90 degree right-angle prisms 12 (claimed "light reflecting means") placed on the light entrance side of the optical lens array 11 to face the three optical lenses 8 in the left and right rows of the matrix, respectively. All the nine optical lenses 8 have a capture angle of 40°. The right-angle prism 12 has a cross-section of a right-angle isosceles triangle, and is inclined to the optical lens array 11 as shown in FIG. 2. This arrangement will be described in detail later. Note here that although not shown, a stop member is placed between the optical lens array 11 and each of the right-angle prisms 12. Further note that the optical lenses 8 are not required to be integrally formed on the transparent substrate 9, and can be held by a lens holder so as to be arranged on a two-dimensional plane.

The three optical lenses 8 in the center column of the optical lens array 11 (such optical lenses 8 being hereafter referred to as "center lenses") directly receive light entering in a front range of approximately 40° (which importantly is not larger than approximately 60°) in the capture angle of 120°, while the three optical lenses 8 in the left column and the three optical lenses 8 in the right column of the optical lens array 11 (such optical lenses 8 being hereafter referred to as "side lenses" which are formed on the same plane on which the center lenses are formed) receive lights entering in left and right ranges (angular ranges) each of approximately 40° (which also importantly is not larger than approximately 60°) in the capture angle of 120° through the two right-angle prisms 12, respectively, which guide the lights. Each of the right-angle prisms 12 is placed such that light enters through an outward side 12a of the two sides containing the right angle, and is reflected by the hypotenuse 12b and emitted through the other side 12c with the light entering each side lens 8 being directed along the optical axis La of the each side lens 8. In the present specification, surfaces of each right-angle prism 12 for guiding and allowing light to enter through and for reflecting and emitting the light are referred to as "sides" and "hypotenuse" to describe such surfaces with reference to the optical path diagram of FIG. 2 (as well as optical path diagrams of FIGS. 7, 9, 11 and 14 described later).

More specifically, as shown in FIG. 2, each right-angle prism 12 is arranged such that the side 12c facing each set of the three side lenses 8 is inclined at an angle of 25° to the major planes of the optical lens array 11, while the hypotenuse 12b is inclined at an angle of 70° (25°+45°) to the major planes of the optical lens array 11. This makes it possible to prevent light entering the center lenses 8 from being interrupted, because no portion of the right-angle prisms 12 exists in the front range of approximately 40° in the capture angle of 120° as seen from the center lenses 8. Each set of the three side lenses 8 collects light entering in the range of approximately 40° through the outward side 12a, which is one of the sides 12a, 12c containing the right-angle of the right-angle prism 12, so as to form images of the light on the photodetector array 3.

Next, the photodetector array 3 will be described. The photodetector array 3 is placed at a predetermined distance from, and in parallel to, the optical lens array 11. More specifically, the photodetector array 3 has major planes parallel to those of the optical lens array 11. The photodetector array 3 used herein is a solid-state imaging element formed, for example, of a semiconductor substrate having imaging areas on a focal plane of the respective optical lenses of the optical lens array 11, and is, for example, a CMOS (Complementary Metal Oxide Semiconductor) image sensor. The photodetector array 3 can also be a CCD (Charge Coupled Device) image sensor. Nine single-eye images 13 are formed on the photodetector array 3, which converts the single-eye images 13 to electronic image information, which in turn is converted by the A/D converter 4 to a digital signal. As will be described in detail below with reference to FIG. 3 and FIG. 4, the combination of the DSP 5 and image reproduction microprocessor 6 reproduces or forms a panoramic image P from the digital signal sent from the A/D converter 4.

Figure 3:
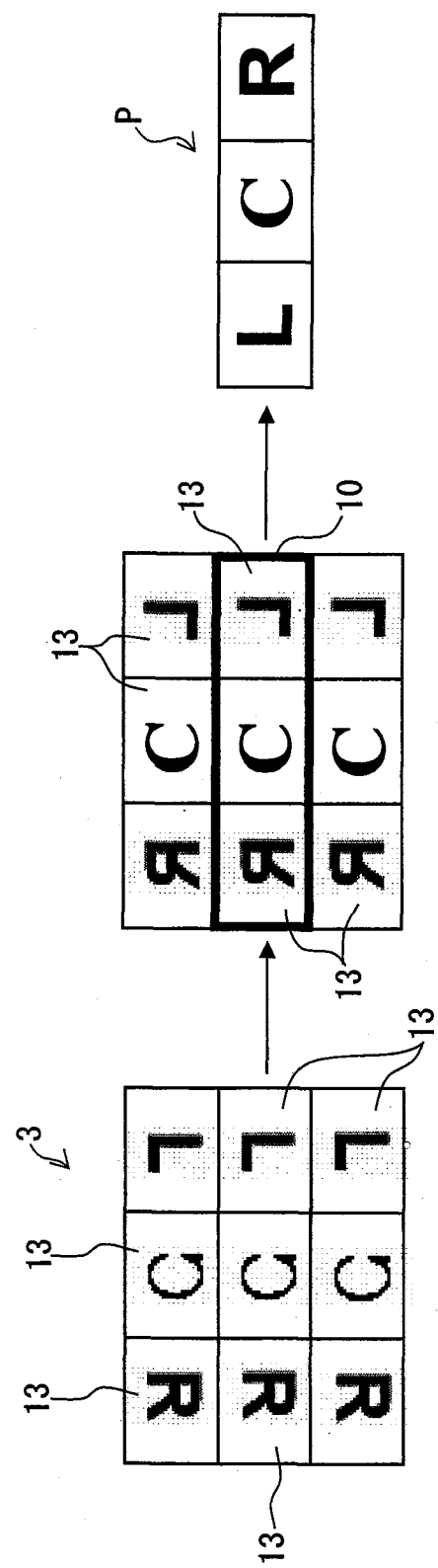
FIG. 3 is a schematic view showing images of a target object to be imaged and shown in FIG. 4 which are, from left to right, a matrix image formed on a photodetector array as well as an intermediate matrix image and a reproduced panoramic image of the target object that are processed by the combination of a DSP and an image reproduction microprocessor.
Figure 4:
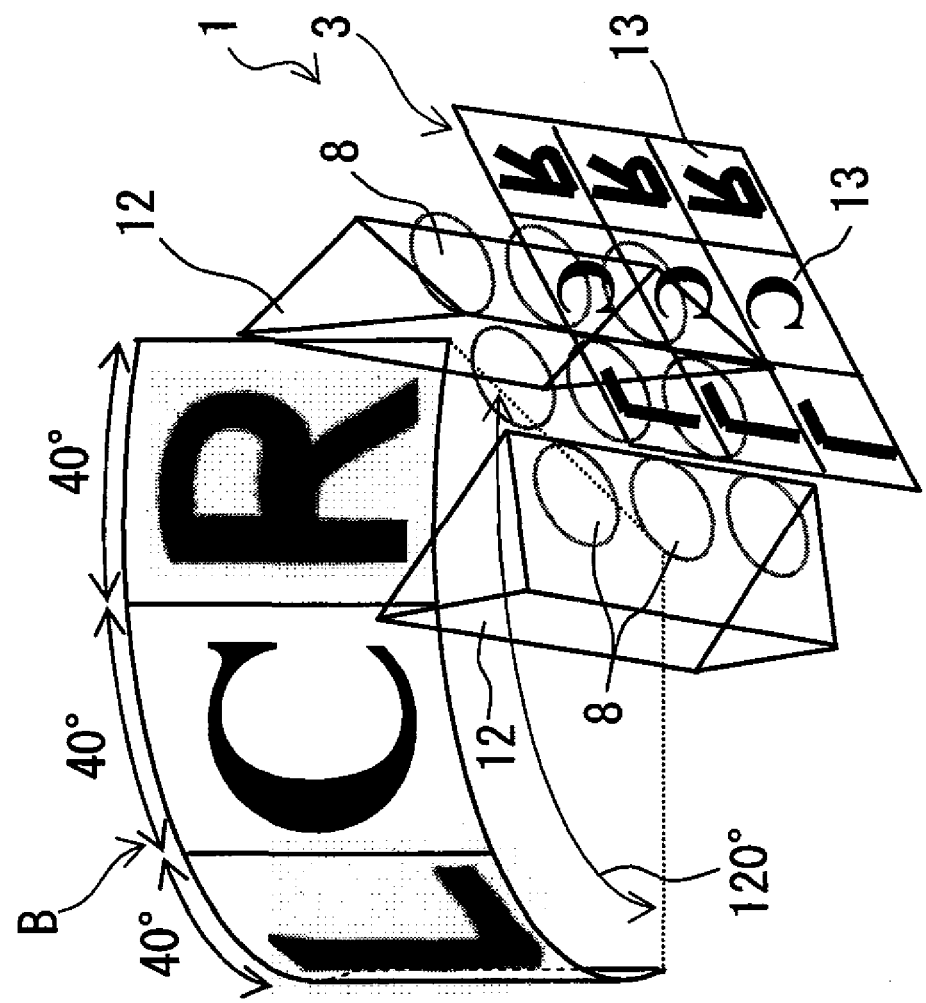
FIG. 4 is a schematic perspective view of a part of the panoramic imaging device along with the target object to be imaged in a capture angle of 120°.

FIG. 3 is a schematic view showing images of a target object B to be imaged and shown in FIG. 4 which are, from left to right, a matrix image (initial matrix image) formed on the photodetector array 3 as well as an intermediate matrix image and a reproduced or formed panoramic image P of the target object B that are processed by the combination of the DSP 5 and the microprocessor 6. FIG. 4 is a schematic perspective view of a part of the panoramic imaging device 1 along with the target object B to be imaged in a capture angle (picture-taking angle) of 120° and having image segments of "L", "C" and "R". As shown in FIG. 4, nine single-eye images 13 are formed on the photodetector array 3 by the optical lenses 8 arranged in the matrix of 3 rows and 3 columns.

As shown in FIG. 4, the images 13 of "C" in the center column formed by the center lenses 8 are inverted up/down and left/right (rotated 180° about the central axis of the image plane) from the original image "C" in the image segment of "C" as seen from the panoramic imaging device 1, while the images 13 of "L" and "R" in the left and right columns formed by the left and right side lenses 8 are inverted only up/down from the original images "L" and "R" in the image segments of "L" and "R" as seen from the panoramic imaging device 1, because the right-angle prisms 12 have a mirror effect.

In the following, the process of ultimately reproducing a panoramic image P of the target object B will be described in detail with reference to FIG. 3. Reference is first made to the leftmost (initial) matrix image of nine single-eye images 13 in FIG. 3 which represents images formed on the photodetector array 3 as seen from the target object B. Here it is assumed that the target object B placed in front of the panoramic imaging device 1 has equiangular (or equilength) image segments of "L", "C" and "R" in successive 40° angular ranges in the capture angle (picture-taking angle) of 120°. In this case, the image segment of "C" (i.e. center image segment in the center 40° angular range) is inverted up/down and left/right by the center lenses 8 as described above to form three single-eye images 13 of "C" in the center column on the photodetector array 3, which are inverted only up/down from the original image of "C" when such single-eye images 13 of "C" are seen from the target object B.

On the other hand, the image segment of "L" (left image segment in the left 40° angular range) and the image segment of "R" (right image segment in the right 40° angular range) are inverted left/right by the right-angle prisms 12, respectively, and are then inverted up/down and left/right by the left and right side lenses 8, respectively. to form three single-eye images 13 of "L" and three single-eye images 13 of "R" in the left column and the right column on the photodetector array 3, respectively. These single-eye images 13 of "L" and "R", when seen from the target object B, are inverted up/down and left/right.

The combination of the DSP 5 and the image reproduction microprocessor 6 converts these nine single-eye images 13 to electronic image information, and sequentially reads such image information, as is, as shown in the middle (intermediate) matrix image in FIG. 3. As shown therein, the positions of the left and right columns of "L" and "R", respectively, are exchanged with or reversed from the original positions of "L" and "R" on the target object B. In addition, the images of "L" and "R" per se in the left and right columns in the middle matrix image in FIG. 3 are inverted left/right from the original images of "L" and "R" on the target object B. The image information in the middle matrix image in FIG. 3 is processed by the combination of the DSP 5 and the microprocessor 6 to reverse the positions of the left and right columns of the single-eye images of "L" and "R", and to invert the images of "L" and "R" per se therein, thereby reproducing a panoramic image P with a picture angle of 120° (degrees) as shown in the rightmost image in FIG. 3. This will be described in more detail below.

The combination of the DSP 5 and the microprocessor 6 performs image processing based on the image information of the three single-eye images 13 of "R", "C" and "L" in the center row in the middle matrix image indicated by a bold frame 10 in FIG. 3. More specifically, the combination of the DSP 5 and the microprocessor 6 mirror-inverts the single-eye image 13 of "R" and the single-eye image 13 of "L" in the center row (that are the right image segment in the right 40° angular range and the left image segment in the left 40° angular range which have been inverted left/right) back to a normal image of "R" and a normal image of "L", respectively, and then combines these normal images of "R" and "L" with the center single-eye image 13 of "C" (in the center image segment in the center 40° angular range), so as to reproduce or form a panoramic image P with a picture angle of 120°.

An advantage of the panoramic imaging device 1 according to the first embodiment here is that the respective images 13 have substantially no distortions at peripheries thereof because the center lenses 8 as well as the left and right side lenses 8 have a capture angle as small as 40° which is not larger than approximately 60°, so that no complex process of distortion correction for the respective images 13 is required when combining the images 13. Furthermore, since each of the three images (single-eye images) 13 is an image in a range of approximately 40°, the three images 13 can be combined with substantially no overlap between adjacent two of the three images 13.

Note that the combination of the DSP 5 and the image reproduction microprocessor 6 in the embodiment here performs image processing based on the image information of the three single-eye images 13 of "R", "C" and "L" in the center row in the middle matrix image shown in FIG. 3. However, it is further possible to perform the image processing based on the image information of all the nine single-eye images 13 in the three rows, for example, such that three sets of the three images 13 in the upper, center and lower rows are subjected to the image processing to form three panoramic images, which are then averaged to reproduce one panoramic image P. This is advantageous because the amount of the image information used for the image processing thereby increases, so that the reproduced panoramic image P increases in image definition.

Figure 5:
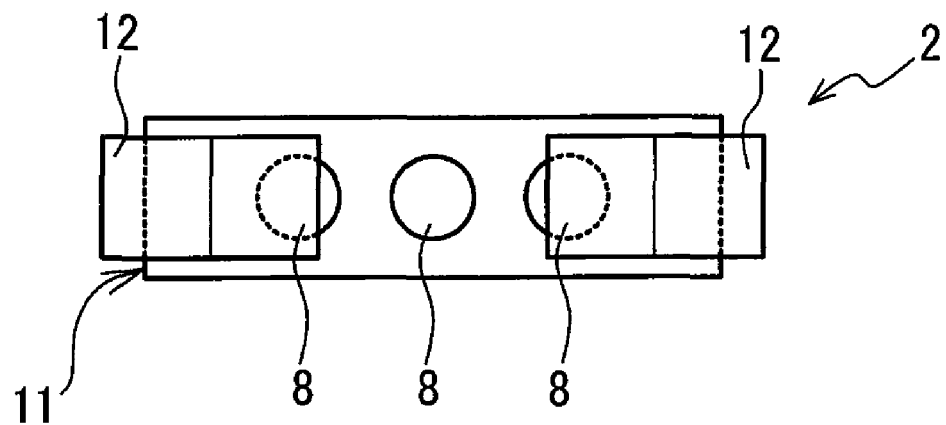
FIG. 5 is a schematic front view of a modified example of the optical lens system in the panoramic imaging device.

It is also possible to use an arrangement shown in FIG. 5 in place of the corresponding arrangement shown in FIG. 1 and FIG. 4. FIG. 5 is a schematic front view of a modified example of the optical lens system 2. The optical lens system 2 of FIG. 5 has a set of an optical lens array 11, two 45-45-90 degree right-angle prisms 12 and a photodetector array 3 for only one row of a matrix image corresponding to that shown in the middle image in FIG. 3. That is, the optical lens array 11 of FIG. 5 has an elongated transparent substrate 9 with three optical lenses 8 integrally formed thereon, in which the center one of the optical lenses 8 is a center lens, while the left and right optical lenses 8 are side lenses. This optical lens array 11 makes it possible to reduce the entire size of the panoramic imaging device 1.

Note that the actual dimensions of the panoramic imaging device 1 shown in FIG. 1 are, for example, that each of the optical lens array 11 and the photodetector array 3 has a size of about 9 (nine) mm square, while the thickness (distance) from the apex of each of the 45-45-90 degree right-angle prisms 12 to the rear surface (i.e. lower surface in FIG. 2) of the photodetector array 3 is about 7 mm. Thus, the panoramic imaging device 1 can be formed thin, reducing the thickness in its entirety.

Second Embodiment

Figure 6:
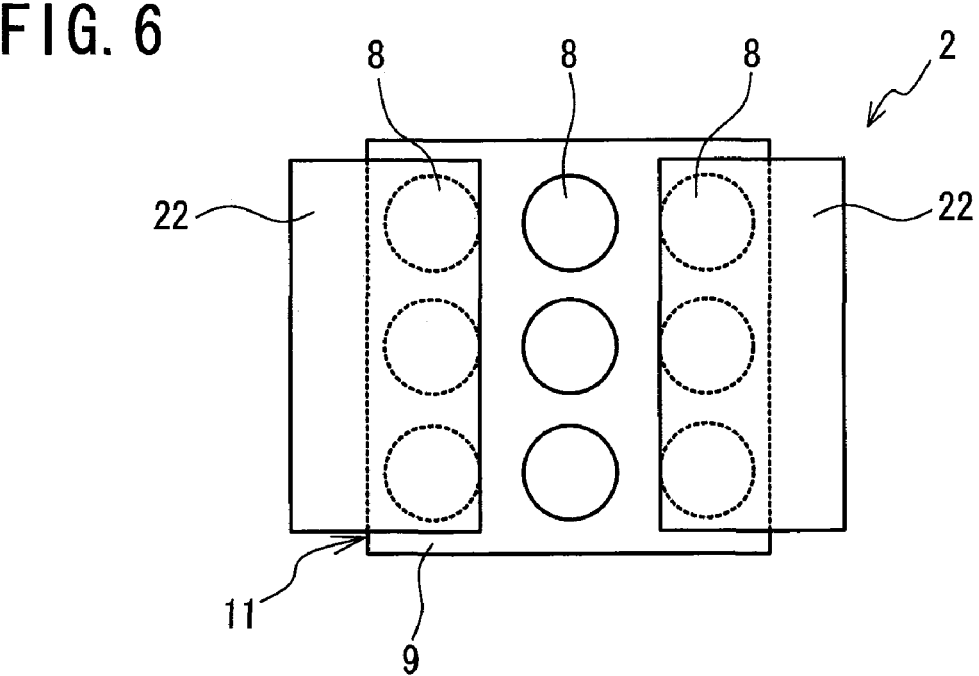
FIG. 6 is a schematic front view of an optical lens system of a panoramic imaging device according to a second embodiment of the present invention.
Figure 7:
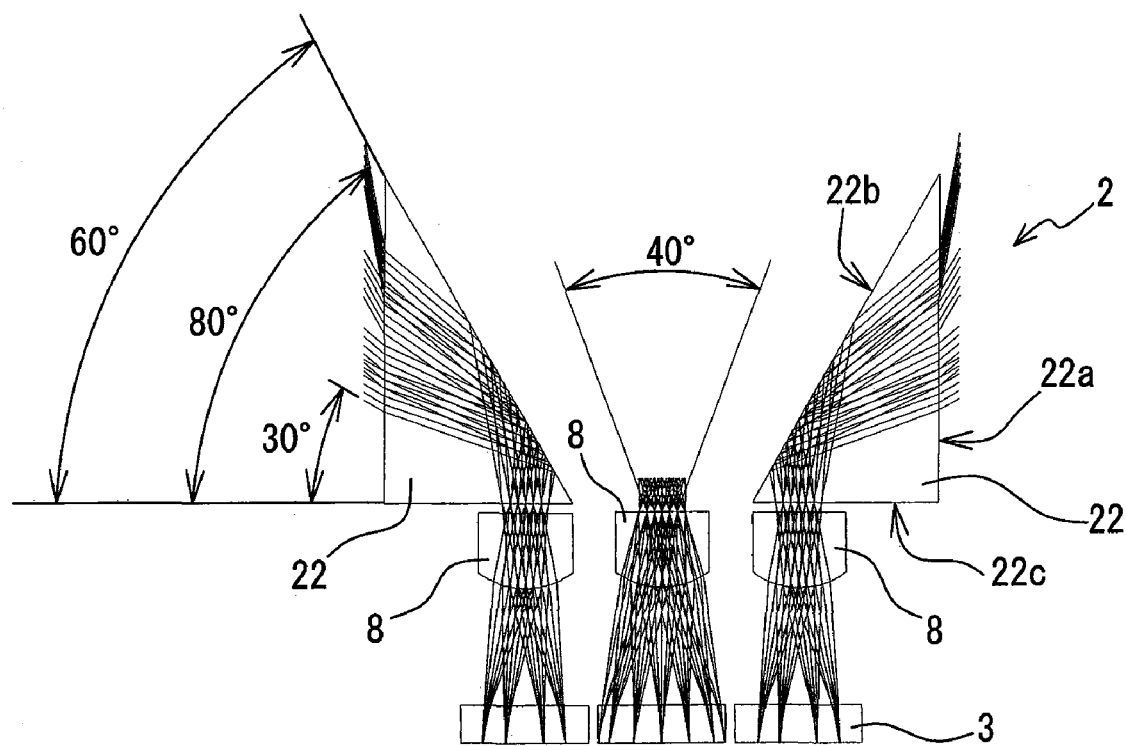
FIG. 7 is a schematic optical path diagram of the optical lens system with optical lenses, showing a light flux passing through each optical lens.

Referring to FIG. 6 and FIG. 7, a panoramic imaging device according to a second embodiment of the present invention will be described. FIG. 6 is a schematic front view of an optical lens system 2 of a panoramic imaging device according to the second embodiment, in which showing of the other parts corresponding to those in FIG. 1, such as a processing circuit including a DSP and an image reproduction microprocessor, is omitted for simplicity. FIG. 7 is a schematic optical path diagram of the optical lens system 2 of FIG. 6 as seen from the bottom thereof, showing a light flux passing through each optical lens 8. Similarly as in the first embodiment, the optical lens system 2 has an optical lens array 11 of optical lenses 8 and a photodetector array 3. In the drawings of the first and second embodiments, like parts are designated by like reference numerals, characters or symbols. Here, description of parts similar to those in the first embodiment is omitted where appropriate.

The panoramic imaging device of the second embodiment is similar to the panoramic imaging device 1 of the first embodiment, except that 30-60-90 degree right-angle prisms 22 (claimed "light reflecting means") for guiding light are placed on the light entrance side of an optical lens array 11 in place of the 45-45-90 degree right-angle prisms 12. As shown in FIG. 7, the right-angle prisms 22 have a cross-section of a right triangle with 30 and 60 degree angles in addition to its right angle. Each right-angle prism 22 has two sides, a longer side 22a and a shorter side 22c, containing the right angle in addition to a hypotenuse 22b, in which the shorter side 22c is parallel to the major planes of the optical lens array 11, while the longer side 22a is positioned outside and extends vertically from an outer end of the shorter side 22c. Thus, the hypotenuse 22b is inclined at an angle of 60° to the major planes of the optical lens array 11.

Each of the right-angle prisms 22 for guiding light is placed such that light enters through the longer side 22a of the right-angle prism 22 in each of the left and right ranges (angular ranges) each of approximately 40° (which importantly is not larger than approximately 60°) in the capture angle of approximately 120°, and is reflected by the hypotenuse 22b and emitted through the shorter side 22c so as to be collected by each of the set of three left side lenses 8 and set of three right side lenses 8 with the light entering each side lens 8 being directed along the optical axis of the each side lens 8, thereby forming, on the photodetector array 3, left and right images for the left and right ranges each of approximately 40°. Similarly as in the first embodiment, each side lens 8 is formed on the same plane on which each center lens 8 is formed, and the left and right images (single-eye images) in the left and right ranges each of approximately 40° are combined by the DSP and the image reproduction microprocessor with center images (single-eye images) in the center range of approximately 40° (which also importantly is not larger than approximately 60°) formed by the center lenses 8 so as to reproduce a panoramic image with a picture angle of approximately 120°.

Each right-angle prism 22 for guiding light in the present embodiment is arranged such that the hypotenuse 22b of the right-angle prism 22 is inclined at an angle of 60° to the major planes of the optical lens array 11. This makes it possible to prevent light entering the center lenses 8 from being interrupted, because no portion of the right-angle prisms 22 exists in the front range of approximately 40° in the capture angle of 120° as seen from the center lenses 8. In addition, the respective left, center and right images formed by the lenses 8 have substantially no distortions at peripheries thereof because the center lenses 8 as well as the left and right side lenses 8 have a capture angle as small as 40°, so that no complex process of distortion correction for the three images is required when combining the three images. Furthermore, since each of the three images (single-eye images) is an image in a range of approximately 40°, the three images can be combined with substantially no overlap between adjacent two of the three images.

Third Embodiment

Figure 8:
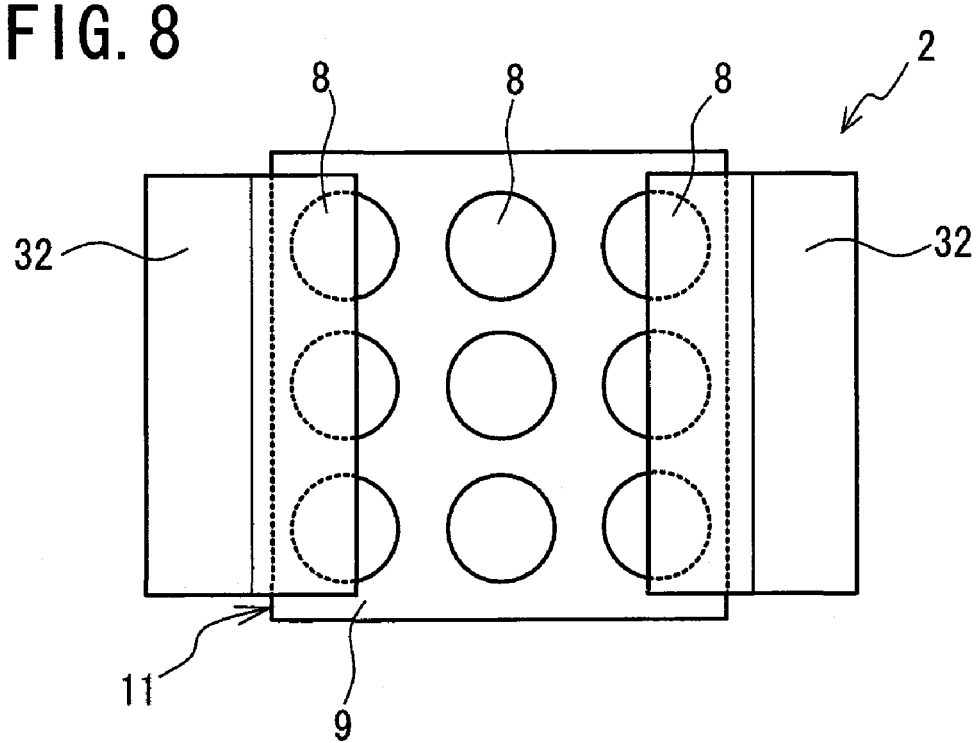
FIG. 8 is a schematic front view of an optical lens system of a panoramic imaging device according to a third embodiment of the present invention.
Figure 9:
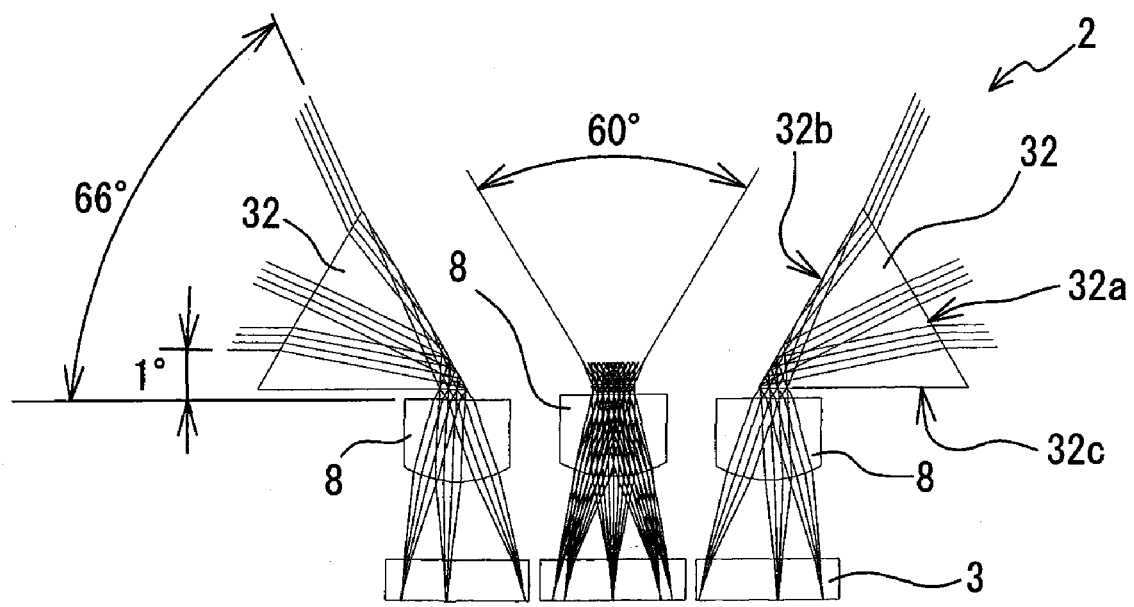
FIG. 9 is a schematic optical path diagram of the optical lens system with optical lenses, showing a light flux passing through each optical lens.

Referring to FIG. 8 and FIG. 9, a panoramic imaging device according to a third embodiment of the present invention will be described, which can capture or take a panoramic image with a picture angle of approximately 180°. FIG. 8 is a schematic front view of an optical lens system 2 of a panoramic imaging device according to the third embodiment, in which showing of the other parts corresponding to those in FIG. 1, such as a processing circuit including a DSP and an image reproduction microprocessor, is omitted for simplicity. FIG. 9 is a schematic optical path diagram of the optical lens system 2 of FIG. 8 as seen from the bottom thereof, showing a light flux passing through each optical lens 8. Similarly as in the first embodiment, the optical lens system 2 has an optical lens array 11 of optical lenses 8 and a photodetector array 3. In the drawings of the first and third embodiments, like parts are designated by like reference numerals, characters or symbols. In the third embodiment, description of parts similar to those in the first embodiment is omitted where appropriate.

The panoramic imaging device of the third embodiment is similar to the panoramic imaging device 1 of the first embodiment, except that the nine optical lenses 8 have a capture angle of 60° or substantially 60° (which importantly is not larger than approximately 60°) to expand the imaging range of the optical lens system 2, and hence the resultant picture angle of a panoramic image, and that equilateral triangle prisms 32 (claimed "light reflecting means") for guiding light are placed on the light entrance side of an optical lens array 11 in place of the 45-45-90 degree right-angle prisms 12. As shown in FIG. 9, the equilateral triangle prisms 32 have a cross-section of an equilateral triangle. Each equilateral triangle prism 32 has three sides 32a, 32b and 32c, in which the side 32c is parallel to the major planes of the optical lens array 11. Thus, the inward side 32b is inclined at an angle of 60° to the major planes of the optical lens array 11.

Each of the equilateral triangle prisms 32 for guiding light is placed such that light enters through the outward side 32a of the equilateral triangle prism 32 in each of the left and right ranges (angular ranges) each of approximately 60° (which importantly is not larger than approximately 60°) in the capture angle of approximately 180°, and is reflected by the inward side 32b and emitted through the side 32c so as to be collected by each of the set of three left side lenses 8 and set of three right side lenses 8 with the light entering each side lens 8 being directed along the optical axis of the each side lens 8, thereby forming, on the photodetector array 3, left and right images for the left and right ranges each of approximately 60° (which also importantly is not larger than approximately 60°). Similarly as in the second embodiment, each side lens 8 is formed on the same plane on which each center lens 8 is formed, and the left and right images (single-eye images) in the left and right ranges each of approximately 60° are combined by the DSP and the image reproduction microprocessor with center images (single-eye images) in the center range of approximately 60° formed by the center lenses 8 so as to reproduce a panoramic image with a picture angle of approximately 180° Similarly as in the second embodiment, each equilateral triangle prism 32 in the present embodiment is arranged such that the inward side 32b of the equilateral triangle prism 32 is inclined at an angle of 60° to the major planes of the optical lens array 11. This makes it possible to prevent light entering the center lenses 8 from being interrupted, because no portion of the equilateral triangle prisms 32 exists in the front range of approximately 60° in the capture angle of 180° as seen from the center lenses 8.

Note that in the case of the third embodiment, the left and right angular ranges for the light entrance into the left and right equilateral triangle prisms 32 may become wider than the above-described 60°, so that the picture angle of each of the two images formed by the two sets of side lenses 8 may correspondingly become wider than 60°. For example, the angular range may become 65° (66°−1°) as shown in the view of the left equilateral triangle prism 32 in FIG. 9. This can be adjusted by increasing overlap between adjacent two of the three images. Also note that in the case of the third embodiment, there is a possibility that the respective three images (single-eye images) on the photodetector array 3 may have some distortions at peripheries thereof because the lenses 8 have a capture angle as large as 60°. This can be solved by using a combined lens consisting of two or three lenses for each of the optical lenses 8, thereby reducing such distortions to an extent that gives practically no problem.

Fourth Embodiment

Figure 10:
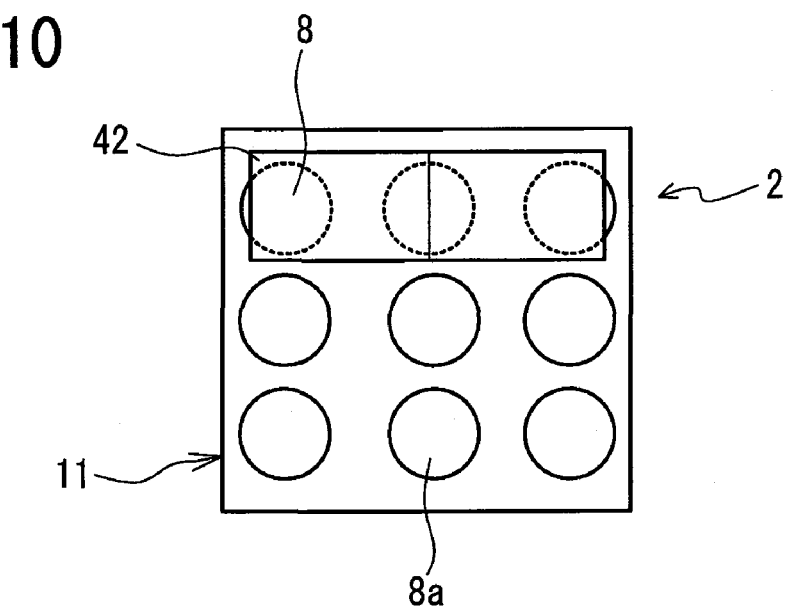
FIG. 10 is a schematic front view of an optical lens system of a panoramic imaging device according to a fourth embodiment of the present invention.
Figure 11:
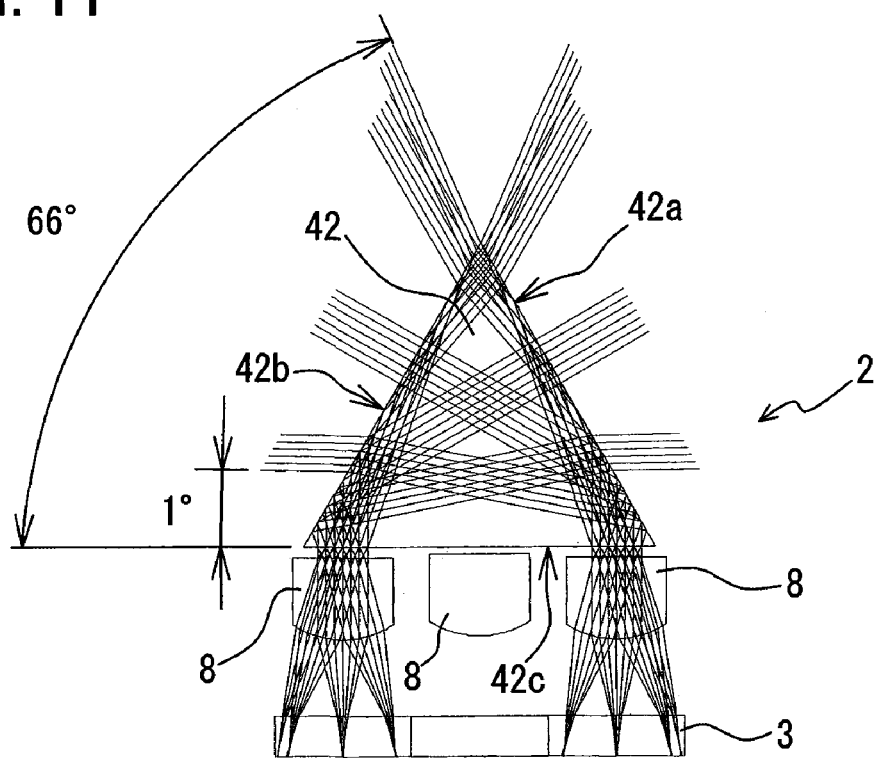
FIG. 11 is a schematic optical path diagram of the optical lens system with optical lenses, showing a light flux passing through each of left and right optical lenses in an upper row of an optical lens array.

Referring now to FIG. 10 and FIG. 11, a panoramic imaging device according to a fourth embodiment of the present invention will be described, which can capture or take a panoramic image with a picture angle of approximately 180°. FIG. 10 is a schematic front view of an optical lens system 2 of a panoramic imaging device according to the fourth embodiment, in which showing of the other parts corresponding to those in FIG. 1, such as a processing circuit including a DSP and an image reproduction microprocessor, is omitted for simplicity. FIG. 11 is a schematic optical path diagram of the optical lens system 2 of FIG. 10 as seen from the bottom thereof, showing a light flux passing through each of left and right optical lenses 8 in the upper row of an optical lens array 11. Similarly as in the first embodiment, the optical lens system 2 has an optical lens array 11 of optical lenses 8 and a photodetector array 3, except that in the present embodiment, the center lens in the upper row, all the three lenses in the center row and the left and right side lenses in the lower row of the optical lens array 11 can be omitted. In the drawings of the first and fourth embodiments, like parts are designated by like reference numerals, characters or symbols. In the fourth embodiment, description of parts similar to those in the first embodiment is omitted where appropriate.

The panoramic imaging device of the fourth embodiment is similar to the panoramic imaging device 1 of the first embodiment, except that here the optical lenses 8 have a capture angle of 60° to expand the imaging range of the optical lens system 2, and hence the resultant picture angle of a panoramic image, and that one large equilateral (regular) triangle prism 42 (claimed "light reflecting means") for guiding light is placed on the light entrance side of an optical lens array 11 in place of the 45-45-90 degree right-angle prisms 12, so as to cover the optical lenses 8 only in the upper row of the optical lens array 11. The length of each side of the equilateral triangle prism 42 is designed to cover the area from the left optical lens 8 to the right optical lens 8 in the upper row of the optical lens array 11.

As shown in FIG. 11, the equilateral triangle prism 42 has a cross-section of an equilateral triangle. The equilateral triangle prism 42 has three sides 42a, 42b and 42c, in which the side 42c is parallel to the major planes of the optical lens array 11, and each of the sides 42a, 42b is inclined at an angle of 60° to the major planes of the optical lens array 11. The equilateral triangle prism 42 for guiding light is placed such that light in the right range of approximately 60° and light in the left range of approximately 60° (which importantly is not larger than approximately 60°) in the capture angle of approximately 180° enter through the side 42a and the side 42b of the equilateral triangle prism 42, respectively, and are reflected by the side 42b and the side 42a, respectively, so as to be emitted through the side 42c and further collected by the left side lens 8 and the right side lens 8 in the upper row of the optical lens array 11 with the light entering each side lens 8 being directed along the optical axis of the each side lens 8, thereby forming, on the photodetector array 3, left and right images (single-eye images) for the left and right ranges (angular ranges) each of approximately 60°.

On the other hand, light in the center range of approximately 60° (which also importantly is not larger than approximately 60°) directly enters, and is collected by, the center lens 8a in the lower row of the optical lens array 11 so as to form a center image (single-eye image) for the center range of approximately 60° on the photodetector array 3. Similarly as in the third embodiment, the left and right images (single-eye images) in the left and right ranges each of approximately 60° are combined by the DSP and the image reproduction microprocessor with the center image (single-eye image) in the center range of approximately 60° so as to reproduce a panoramic image with a picture angle of approximately 180°. An advantage of the panoramic imaging device according to the present embodiment is that the positions of the left and right single-eye images (in left and right columns in the upper row of the optical lens array 11) are not necessary to be exchanged with or reversed from the corresponding original positions on a target object, so that the image reproduction process by the combination of the DSP and the image reproduction microprocessor can thereby be simplified.

In the panoramic imaging device of the present embodiment, the equilateral triangle prism 42, which is placed to cover the area from the left optical lens 8 to the right optical lens 8 in the upper row of the optical lens array 11, refracts light from the target object to be imaged, while the center optical lens 8a in the lower row of the optical lens array 11 collects light entering the panoramic imaging device in the front range of approximately 60°. This makes it possible to prevent light entering the center lens 8 from being interrupted, because no portion of the equilateral triangle prism 42 exists in the front range of approximately 60° in the capture angle of 180° as seen from the center lens 8a.

Fifth Embodiment

Figure 12:
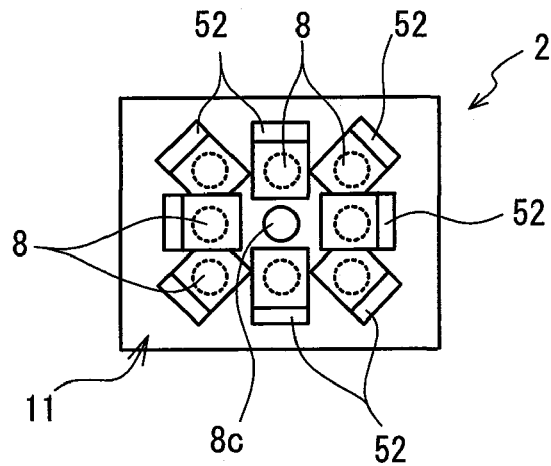
FIG. 12 is a schematic front view of an optical lens system of a panoramic imaging device according to a fifth embodiment of the present invention.
Figure 13:
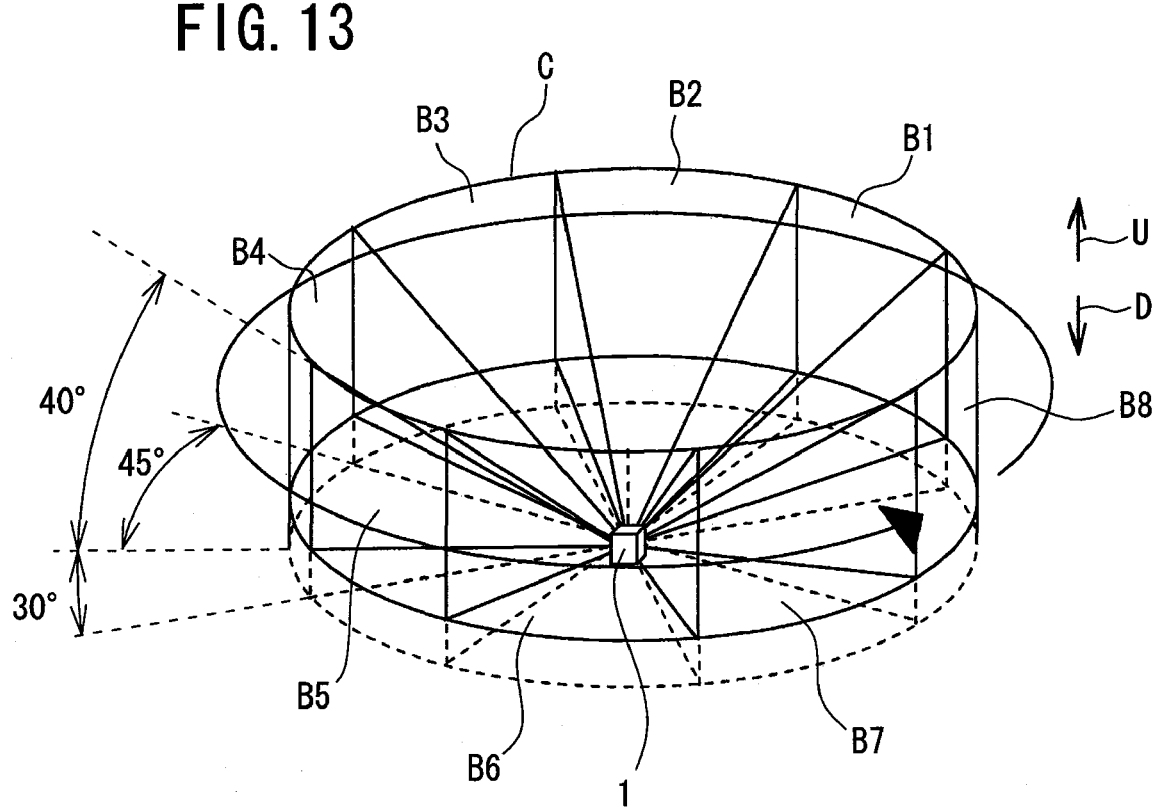
FIG. 13 is a schematic perspective view of the panoramic imaging device, showing eight angular ranges B1 to B8 in a capture angle of 360° around an axis perpendicular to the plane of FIG. 12 and passing through the center of a center lens.

Referring to FIG. 12 and FIG. 13, a panoramic imaging device 1 according to a fifth embodiment of the present invention will be described, which can capture or take a panoramic image of a hemisphere (more specifically, upper hemisphere projecting above the panoramic imaging device 1 in the direction of arrow U in FIG. 13), namely an image in a substantially hemispherical range as seen from the panoramic imaging device 1 forward. FIG. 12 is a schematic front view of an optical lens system 2 of a panoramic imaging device 1 according to the fifth embodiment with a center lens 8c and eight side lenses 8, in which showing of the other parts corresponding to those in FIG. 1, such as a processing circuit including a DSP and an image reproduction microprocessor, is omitted for simplicity. FIG. 13 is a schematic perspective view of the panoramic imaging device 1, showing eight angular ranges B1 to B8 in the capture angle of 360° around an axis perpendicular to the plane of FIG. 12 and passing through the center of the center lens 8c. In the drawings of the first and fifth embodiments, like parts are designated by like reference numerals, characters or symbols. In the fifth embodiment, description of parts similar to those in the first embodiment is omitted where appropriate.

The panoramic imaging device 1 of the fifth embodiment is similar to that of the first embodiment in that, for example, it has a combination of a DSP and an image reproduction microprocessor as well as an optical lens array 11 with nine optical lenses 8 (8c) in a matrix of 3 rows and 3 columns along with a photodetector array 3 placed at a predetermined distance from the optical lens array 11. The panoramic imaging device 1 of the fifth embodiment is different from that of the first embodiment in that here eight 45-45-90 degree right-angle prisms 52 (claimed "light reflecting means") are placed on the light entrance side of an optical lens array 11 (optical lens system 2) at positions facing the eight optical lenses (side lenses) 8, respectively, except for the optical lens 8c (center lens) placed at the center of the 3-row 3-column matrix, so as to collect lights entering from all directions in the substantially hemispherical range. This will be described in detail below with reference to FIG. 12.

As shown in FIG. 12, the eight 45-45-90 degree right-angle prisms 52 for guiding light are placed at radial positions around the center optical lens 8c so as to face the eight optical lenses 8, respectively, among the nine optical lenses in the 3-row 3-column matrix except the optical lens 8c at the center of the matrix. Similarly as in the first embodiment, each right-angle prism 52 is arranged such that one side of the prism 52 facing the optical lens array 11 is inclined at an angle of 25° to the major planes of the optical lens array 11, while the hypotenuse of the prism 52 is inclined at an angle of 70° (25°+45°) to the major planes of the optical lens array 11. Similarly as in the first embodiment, light entering each optical lens (side lens) 8 is directed along the optical axis of the each optical lens 8. This makes it possible to prevent light entering the optical lens 8c at the center of the 3-row 3-column matrix (in the direction of arrow D in FIG. 13) from being interrupted, because no portion of the right-angle prism 52 exists in the front range of approximately 40° as seen from the center lens 8c. Note that although not shown in FIG. 13, the optical lens array 11 (optical lens system 2) shown in FIG. 12 is arranged such that the front surface of the optical lens array 11, which is shown in FIG. 12, faces vertically upward in the direction of arrow U in FIG. 13.

In the panoramic imaging device 1 of the fifth embodiment, only the one optical lens 8c at the center of the 3-row 3-column matrix is a center lens, while the other eight optical lenses 8 are side lenses, although each side lens 8 is formed on the same plane on which the center lens 8c is formed. Thus, an image in the front (upward in the direction of arrow U in FIG. 13) range of approximately 40° (which importantly is not larger than approximately 60°) of the panoramic imaging device 1 is captured by the center lens 8c and formed on the photodetector array 3 as a single-eye image, while eight images are captured by the eight side lenses 8 and formed on the photodetector array 3 as eight single-eye images for eight angular ranges B1 to B8 in the horizontal capture angle of 360° and in a vertical angular range of approximately 40° at a peripheral portion of the hemisphere as indicated by an imaginary cylinder C in FIG. 13. As apparent from the above description and as shown in FIG. 13, each of the angular ranges B1 to B8 has a horizontal capture angle of 45° (which also importantly is not larger than approximately 60°). These nine single-eye images are combined by a DSP and an image reproduction microprocessor so as to reproduce a panoramic image of the hemisphere, or more specifically an image in the substantially hemispherical range.

Sixth Embodiment

Figure 14:
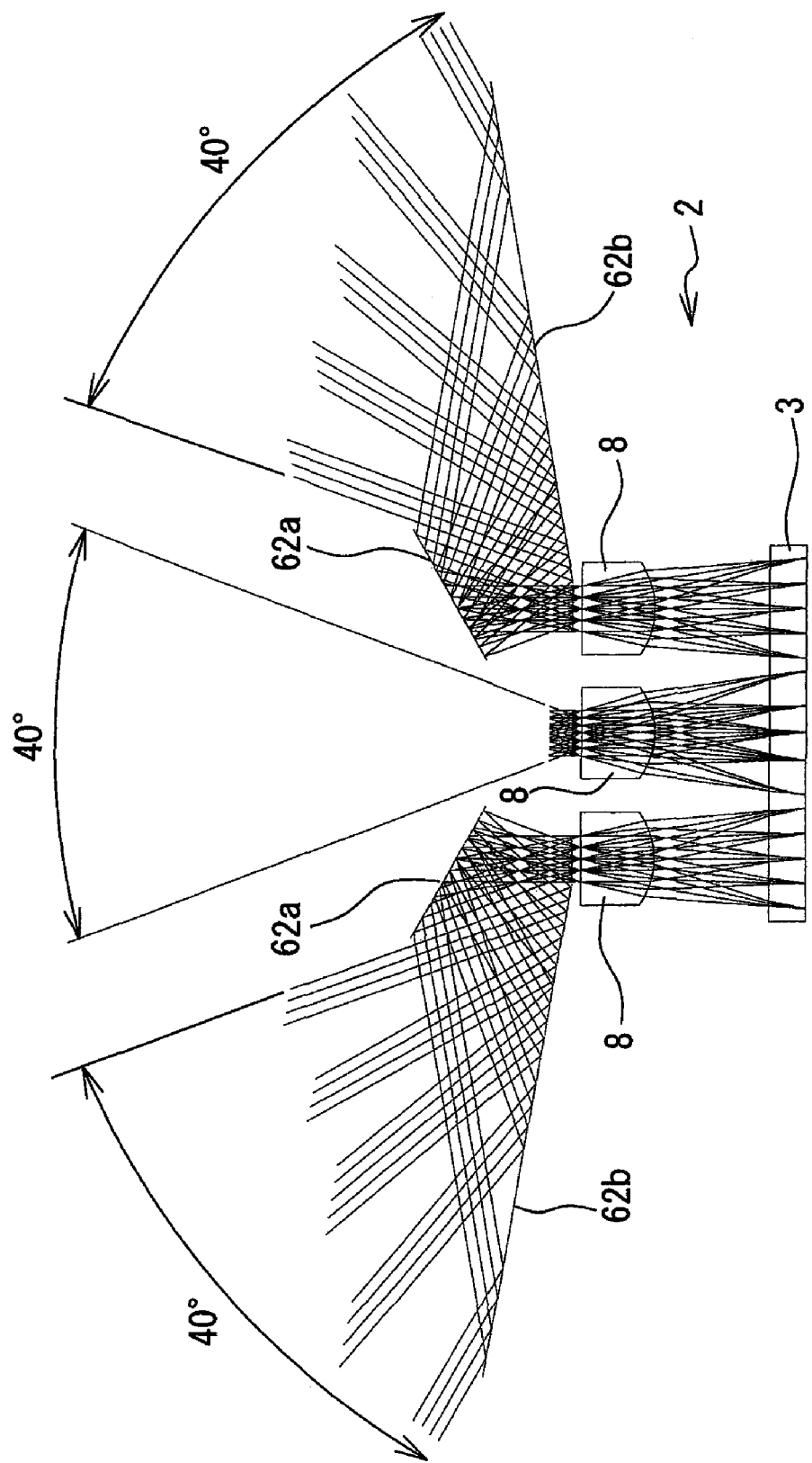
FIG. 14 is a schematic optical path diagram of an optical lens system with optical lenses of a panoramic imaging device according to a sixth embodiment of the present invention, showing a light flux passing through each optical lens.

Referring to FIG. 14, a panoramic imaging device for capturing or taking a panoramic image with a picture angle of 120° according to a sixth embodiment of the present invention will be described, in which a prism or prisms placed on the light entrance side of an optical lens array in the previous embodiments herein are replaced by mirrors 62a, 62b (claimed "light reflecting means") for guiding light. FIG. 14 is a schematic optical path diagram of an optical lens system 2 of a panoramic imaging device according to the sixth embodiment as seen from the bottom thereof, showing a light flux passing through each optical lens 8, in which showing of the other parts corresponding to those in FIG. 1, such as an optical lens array and a processing circuit including a DSP and an image reproduction microprocessor, is omitted for simplicity. Similarly as in the first embodiment, the optical lens system 2 has an optical lens array of optical lenses 8 and a photodetector array 3. Although not shown in FIG. 14, the optical lens system 2 has optical lenses 8 in a matrix of 3 rows and 3 columns similarly as in the first embodiment. In the drawings of the first and sixth embodiments, like parts are designated by like reference numerals, characters or symbols. In the sixth embodiment, description of parts similar to those in the first embodiment is omitted where appropriate.

The panoramic imaging device of the sixth embodiment is basically the same in mechanism and function as the panoramic imaging device 1 of the first embodiment, except that in the present embodiment, a pair of first mirrors 62a are placed at positions facing left and right side lenses 8 in place of the right-angle prisms 12, respectively, in which each first mirror 62a is inclined at an angle of approximately 30° to the major planes of the optical lens array. A pair of second mirrors 62b are placed at positions outside the left and right side lenses 8, respectively, so as not to interrupt lights reflected from the first mirrors 62a, respectively. No portion of the pairs of first and second mirrors 62a, 62b exists in the front range of approximately 40° in a capture angle of 120° as seen from the center lenses 8, making it possible to prevent light entering the center lenses 8 from being interrupted.

Each set of the first mirror 62a and the second mirror 62b for guiding light is placed such that light entering in each of the left and right ranges (angular ranges) each of approximately 40° (which importantly is not larger than approximately 60°) in the capture angle of approximately 120° is reflected by the second mirror 62b and then by the first mirror 62a so as to enter each of the left and right side lenses 8 with the light entering each side lens 8 being directed along the optical axis of the each side lens 8, thereby forming, on the photodetector array 3, left and right images (single-eye images) for the left and right ranges each of approximately 40°. On the other hand, light in the center range of approximately 40° in the capture angle of approximately 120° directly enters, and is collected by, the center lenses 8 so as to form a center image (single-eye image) for the center range of approximately 40° (which also importantly is not larger than approximately 60°) on the photodetector array 3.

Similarly as in the first embodiment, the left and right images (single-eye images) in the left and right ranges each of approximately 40° are combined by the DSP and the image reproduction microprocessor with the center image (single-eye image) in the center range of approximately 40° so as to reproduce a panoramic image with a picture angle of approximately 120°. An advantage of the panoramic imaging device according to the present embodiment is that the left and right single-eye images are not inverted left/right from corresponding original images (on a target object), so that the image reproduction process by the combination of the DSP and the image reproduction microprocessor can thereby be simplified.

As described in the foregoing, the panoramic imaging device according to the embodiments of the present invention comprises: an optical lens array with center and side lenses integrally formed thereon and having mutually parallel optical axes; and light reflecting means (either prisms 12, 22, 32, 42 or 52 or mirrors 62a, 62b) placed on the light entrance side of the optical lens array for guiding and reflecting lights entering the optical lens array in left and right angular ranges in a capture angle of at least 120° (for example, 120°, 180° and 360°) to the left and right side lenses, respectively, such that light entering each side lens is directed along the optical axis of the each side lens, and that each of the center and side lenses receives light entering in a front range and in left and right ranges of not larger than approximately 60° (for example, approximately 40° or 60°) in the capture angle of the at least 120°. The panoramic imaging device further comprises an imaging means formed of a photodetector array placed in parallel to the optical lens array. This panoramic imaging device makes it possible to capture or take a panoramic image with a picture angle of at least 120° by a minimum number of optical systems without using an optical lens having a capture angle much greater than 60°, and to combine multiple images into a panoramic image without complex image correction and without causing unnatural transition between adjacent images to remain, and also to reduce the entire volume and thickness thereof.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2006-114306 filed Apr. 18, 2006, the content of which is hereby incorporated by reference.

What is claimed is:

1. A panoramic imaging device comprising:
an optical lens system for collecting light entering in a capture angle of at least 120° so as to form images on a predetermined focal plane;
imaging means placed at the focal plane for converting the images formed by the optical lens system to electronic image information; and
image reproducing means for subjecting the electronic image information obtained from the imaging means to imaging processing so as to reproduce a panoramic image,
wherein the optical lens system comprises:
an optical lens array having a center lens for receiving light entering in a front range of not larger than 60° in the capture angle as well as left and right side lenses which are formed on the same plane as that with the center lens formed thereon and on left and right sides of the center lens, respectively, and which have optical axes parallel to that of the center lens, so as to respectively receive lights entering in left and right ranges each of not larger than 60° in the capture angle; and light reflecting means placed on a light entrance side of the optical lens array for guiding and reflecting the lights entering in the left and right ranges each of not larger than 60° in the capture angle to the left and right side lenses, respectively, such that each light entering each side lens is directed along the optical axis of the each side lens, wherein the imaging means is formed of a photodetector array placed at a predetermined distance from, and in parallel to, the optical lens array for capturing an image formed by the center lens and images formed by the left and right side lenses, and wherein the image reproducing means combines the image formed by the center lens in the front range of not larger than 60° in the capture angle with the images respectively formed by the left and right side lenses in the left and right ranges each of not larger than 60° in the capture angle so as to reproduce a panoramic image with a picture angle of at least 120°.

2. The panoramic imaging device according to claim 1, wherein the light reflecting means placed on the light entrance side of the optical lens array is positioned at a position to prevent light entering the center lens in the front range in the capture angle from being interrupted thereby.

3. The panoramic imaging device according to claim 2, wherein the light reflecting means comprises at least one prism.

4. The panoramic imaging device according to claim 3, wherein the center lens receives light entering in the front range of 40° in the capture angle, while the left and right side lenses respectively receive lights entering in the left and right ranges each of 40° in the capture angle.

5. The panoramic imaging device according to claim 4, wherein the light reflecting means comprises 45-45-90 degree right-angle prisms.

6. The panoramic imaging device according to claim 4, wherein the light reflecting means comprises 30-60-90 degree right-angle prisms.

7. The panoramic imaging device according to claim 3, wherein the center lens receives light entering in the front range of 60° in the capture angle, while the left and right side lenses respectively receive lights entering in the left and right ranges each of 60° in the capture angle.

8. The panoramic imaging device according to claim 7, wherein the light reflecting means comprises at least one triangle prism.

9. The panoramic imaging device according to claim 2, wherein the light reflecting means comprises mirrors.

* * * * *